March 8, 1960 F. J. FEAGIN ET AL 2,928,071
INTERPRETATION OF GEOPHYSICAL DATA
Filed Jan. 15, 1959

INVENTORS.
FRANK J. FEAGIN,
MALCOLM R. MAC PHAIL,
BY WILLIAM M. RUST, JR.,

John B. Davidson
ATTORNEY.

United States Patent Office 2,928,071
Patented Mar. 8, 1960

2,928,071

INTERPRETATION OF GEOPHYSICAL DATA

Frank J. Feagin, Malcolm R. MacPhail, and William M. Rust, Jr., Houston, Tex., assignors, by mesne assignments, to Jersey Production Research Company, Tulsa, Okla., a corporation of Delaware Application January 15, 1959, Serial No. 786,939

6 Claims. (Cl. 340—15)

This is a continuation-in-part of co-pending application Serial No. 382,588, filed September 28, 1953.

This invention relates to geophysical prospecting and to a method and apparatus for obtaining objective interpretations, based on rationally established criteria, of complex geophysical data containing both useful and irrelevant information.

Geophysical prospecting is concerned primarily with the problem of locating and determining the nature of geologic structures which are buried far below the surface of the earth. There are a number of geophysical prospecting methods each concerned with the measurement of a particular physical property of the earth and the interpretation of said measurements. Since the problem is to locate geological structures, it is necessary to carry out the measurements at points distributed over wide areas of the earth's surface. The information obtained at each of these observation points must then be compared or correlated with the information from the other points before an over-all interpretation of the data can be made. In general, the geophysical information obtained during prospecting operations is of enormous complexity and contains a large proportion of extraneous, or noise, components which make the interpretation of such data a formidable task. In many instances it is virtually impossible to separate the useful from the extraneous components of the data and it frequently occurs that two or more equally skilled interpreters arrive at different conclusions regarding the meaning of the data. It is apparent, therefore, that a need exists for more refined methods of geophysical interpretation.

Where geophysical investigations are conducted by means of instruments lowered into holes drilled in the earth, as in electrical logging, radioactivity logging, dipmeter logging, and the like, it is necessary to compare the well logs obtained in a number of holes in a particular area so as to obtain an indication of the depths of a particular geological formation at the various borehole sites. The practice has been to examine the well logs visually in an effort to associate a characteristic variation or "kick" in the measured quantity with a particular geologic formation. If such a correlation can be made using the logs obtained in wells distributed over an area, it is possible, of course, to map the subsurface structure with reasonable accuracy. In many cases, however, the appearance of the same formation on well logs from scattered wells will vary widely as a result of certain changes in the formation itself and it requires great skill to properly interpret the logs and to correlate formations from well to well.

In the case of wildcat wells it is very desirable to obtain information about the subsurface structures but there being no other wells in the vicinity it is not possible to compile the data from a number of separate well logs. To meet this problem special well logging devices known as dipmeters have been developed which are intended to provide structural information about the subsurface from the single borehole. These devices operate by locating the interface between two particular formations at several points around the periphery of the borehole. If the interface is shown to intersect the borehole wall a fraction of an inch higher on one side of the hole than on the other, this may be interpreted as meaning that the subsurface formations lie at an angle with respect to the horizontal. In practice, at least three indications of the interface are obtained around the sides of the borehole and from the positions of these three points the plane marking the interface between the particular two formations is calculated. Here again, the problem concerns the separation of extraneous indications from those which are significant. For example, in the caliper type dipmeter, three arms extend outwardly from the instrument and bear against the wall of the borehole. The amount of extension of each arm is recorded continuously at the surface thereby drawing a miniature profile of the borehole wall at three azimuths. The interface between a relatively hard and a soft formation is indicated by a point where the profile suddenly changes from normal or bit size to a relatively greater diameter. Actually, the wall of a borehole is quite irregular, not only because of variations in hardness but also because of many random effects which occur during the drilling operation. Here again, is a situation where the useful information is clouded and confused by a large amount of "noise" which can contribute nothing to the determination of the dip of the formations. It has been found necessary, therefore, to consider not individual interfaces or washouts on the caliper type dipmeter records but, instead, to consider 30 to 50 foot sections of the logs and to attempt to find the displacement of the three profiles with respect to each other which results in the best fit or the highest correlation. In holes which have many irregular washes and in which strong contrasts in hardness do not occur, the interpretation of dipmeter logs is exceedingly difficult and different human computers may easily arrive at different conclusions as to the actual subsurface conditions.

Seismic prospecting, as practiced today, consists essentially of the steps of initiating a disturbance at a known point in the earth's crust and recording the resulting earth motion at a number of spaced detector stations. These recordings usually take the form of a plurality of galvanometer traces positioned side by side on a strip of photographic paper. These recordings are examined visually, and if particular seismic events on the recording can be identified as reflections from subsurface beds and if the seismic velocity of the subsurface material is known, it becomes a relatively straight forward problem in geometry to calculate the depth of the reflecting interface and its angle of dip. Most of the problems associated with seismic prospecting are not related to the calculations but are concerned with the identification on the seismogram of those seismic events to which the computations may be applied. Unfortunately, the firing of an explosive charge in a borehole does not produce a simple motion of the earth's crust. On the contrary, the resulting seismic disturbance is a thing of great complexity. Energy is radiated in all directions thus wasting, from the geophysicist's standpoint, all the energy put into the ground except for the minute amount which travels downward in a particular direction. Also, the exposion creates different types of wave motion which behave differently in travelling through the earth's crust and which travel with different velocities. Some of the energy appears as surface waves which cause relatively large signals at the geophones but which carry no useful information. To further complicate the situation, the medium through which the waves are propagated, the earth, is a body of almost unparalleled complexity with inhomogeneities occurring in all of its physical constants even within a relatively small volume. All of these factors operate to complicate the problem of seismic prospecting so that even in a relatively "good" area a record obtained with a single geophone and recording system would defy interpretation and it would be most difficult, if not impossible, to identify any particular wave on the record as a reflection.

Over the past 20 years the progress of seismic prospecting has been marked by a succession of techniques for separating the received seismic signal into that part yielding useful information which might be termed the message and the residue which has been termed noise. One of the earliest steps taken to accentuate the useful portion of the signal was a separation on a frequency basis. It was found that for any particular area the useful information was contained in a relatively narrow frequency band. Band pass filters were therefore utilized to increase the intelligibility of the record or to improve the message-to-noise ratio. While this technique of separating message from noise on a frequency basis made the identification of reflected energy easier, it was still a formidable task and other expedients were applied. Instead of using a single geophone to record the earth motion, a number of geophones were laid out, usually along a line extending from the shot point. While any single geophone signal obtained in this way was no more informative than previously, it was found that reflections could be identified with much more certainty, for reflections could be expected to appear on the various traces with a distinct and uniform time delay. Technique utilizing this characteristic amounts to a separation of the message from the noise on a direction-of-arrival basis. Just as a reduction in frequency band width to a point results in an improved message-to-noise ratio, so also a more and more directional receiver, if properly oriented with respect to the path of arrival of the signal may improve the message-to-noise ratio. More recently the utilization of this "directional receiver" technique in seismic prospecting has been extended by the use of large clusters of geophones laid out in such patterns as to accentuate seismic waves, within certain frequency limits, which arrive from a vertical or near vertical direction.

At the present stage of the seismic prospecting art, therefore, the problem of improving the message-to-noise ratio has been attacked by applying two separation processes; one on a frequency basis and one on a direction of arrival basis. These methods have been of material assistance to exploration geophysics, but present techniques still leave much to be desired. In certain areas, using all available methods, records are still obtained on which the most experienced human computers are unable to identify reflections. In a recent paper which appeared in volume XVI, page 450 of Geophysics, a study is presented of the ability of typical computers to identify reflections in the presence of known amounts of noise. Working from synthetic records it was concluded that with conventional multitrace presentation, the number of correctly identified reflections was directly related to the message-to-noise ratio. Below about 0 db message-to-noise, it was found to be impossible to distinguish consistently the reflected events. Unfortunately, many records are still obtained which have message-to-noise ratios lower than this value. It thus becomes pertinent to consider other ways of detecting the correlation of reflected events between the traces of a seismogram.

The purpose of all the foregoing methods of geophysical interpretation is to discover the depths, at various points, at which similar characteristic signals appear on the record. Knowing said depths, the dip of the lithologic formation which exhibits said characteristic signal can be determined. The computing methods currently in use are inefficient when applied to highly complex data. Expert computers often disagree as to the correct interpretation to be applied to particular data. Often, the data are so complex as to not even be subject to interpretation by expert computers.

It is an object, therefore, of this invention to provide a method and apparatus for the interpretation of geophysical data which is not subject to the inconsistencies of human computers.

It is a further object of this invention to provide a method and apparatus for quickly and easily interpreting geophysical data which are so complex it is impossible for a human computer to interpret said data.

It is a further object of this invention to provide a method and apparatus for separating the useful from the extraneous components present in geophysical data and for providing a quality rating of the data by which the reliability of the interpretation may be determined.

The aforementioned objects are carried out in this invention by the provision of a method and apparatus by which an arbitrarily established criterion is applied to the correlation of a plurality of geophysical data recordings whereby a very large number of interpretations are successively tried until the "best" correlation of all the recordings is obtained thus identifying the interpretation which is most probably the correct one. Examples of criteria applied are the so-called "least square" criterion and the "cross-correlation" criterion.

Briefly described, our method consists of, first, detecting a physical property of the earth at a plurality of spaced points and recording the quantity so detected as a plurality of electrical signals. The quantity may be recorded as a function of depth, as in electrical logging or dipmeter logging, or as a function of time, as in seismic prospecting, with time indicating depth. Portions of the quantity so recorded are transcribed onto a magnetic drum. By means of an electronic circuit, the recordings on the magnetic drum are picked-off and a single electrical signal is produced according to the particular criterion for the degree of closeness of fit chosen. The depth (or time) displacements between the plurality of electrical signals is varied until an extreme value of said single electrical signal indicates the "best fit." The particular displacement which produced the extreme value is then converted and expressed in terms of geological structure.

The invention will be more readily understood upon consideration of the following description in connection with the accompanying drawings, wherein.

Figure 1:
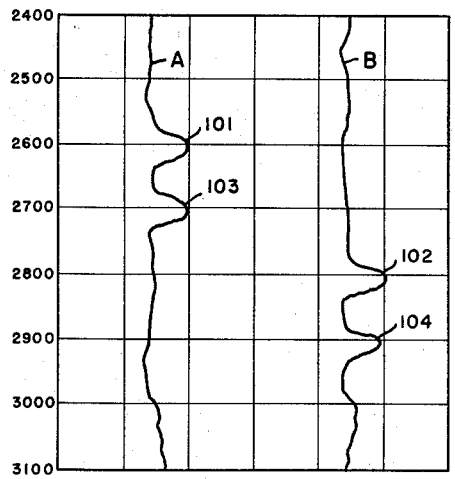
Fig. 1 shows an electrical resistivity log taken at two spaced locations.

As has been pointed out, many geophysical operations involve making physical measurements as a function of some independent variable such as time, or depth. Such measurements are a mixture of information which is geologically significant and variations which are not geologically significant. In practice, such measurements are made at a plurality of locations. A fundamental problem is to separate the significant information (or "message") from the non-significant variations (or "noise"). If there were no significant change in the geological conditions between two locations, the significant part of the measurement, the "message," would not change; any change would thus be solely in the "noise." In general, the differences in the "noise" between the two locations may be expected to vary with the independent variable in a random manner. However, a change in depth of a group of strata produces a systematic shift of the portion of the "message" corresponding to that group of strata without an equivalent systematic shift in the noise. Thus it is possible to make the best estimate of the shift in the geological group of strata, by determining the shift required to give the best fit between the measurements.

It thus appears to be a promising approach to consider the part of the signal which, after certain corrections have been applied, correlates from signal to signal with a determined depth displacement between adjacent signals to be message and to consider the residue to be noise.

For ease of handling, it is advisable to use mathematical expressions for the above. Let:

$\tau$=the depth (time) displacement
$f(t)$=signal
$g(t)$=message
$e(t)$=noise

The expression for the first signal is:

$$f_1(t)=g_1(t)+e_1(t)$$

or $$e_1(t)=f_1(t)-g_1(t) \quad (1)$$

and for the second signal:

$$f_2(t)=g_2(t)+e_2(t) \quad (2)$$

Except for the displacement, $g_1(t)$ and $g_2(t)$ are the same; thus $$g_2(t)=g_1(t+\tau)$$

or $$f_2(t)=g_1(t+\tau)+e_2(t)$$

or $$g_1(t)=f_2(t-\tau)-e_2(t-\tau)$$

or $$e_2(t-\tau)=f_2(t-\tau)-g_1(t) \quad (3)$$

Having arrived at the above expressions, one may next choose a definition of the closeness of fit for matching the messages as they appear in each individual signal. By analogy to the familiar criteria of fitting curves to experimental data by "least squares," one suitable definition of a criterion of the closeness of fit would be based on the squared differences between each signal and the message $g(t)$. The use of the "least squares" method for curve fitting in this case would be to find $\tau$ and a function $g(t)$, of the independent variable, such that the average of the sum of the positive measure of the differences between $g(t)$ and each of the two measurements is a minimum when the second measurement is shifted by $\tau$. When one uses the square as the measure of the error, it can be shown that $g(t)$ is the average of the original measurements with the second shifted by an amount $\tau$.

Hence, the average over an appropriate interval of the sums of the squares of the right-hand members of Equations (1) and (3) can be used as the criterion of closeness of fit. To simplify the explanation of the derivation of the criterion for closeness of fit, it has been assumed only two traces or measurements are to be correlated. However, the formulation can readily be extended to any number of locations or sets of measurements. If $n$ traces are to be correlated the criterion becomes $$\Sigma_n[f_n(t-[n-1]\tau)-g(t)]^2$$

averaged for values of depth (or time) over a desired interval $2T$ on each signal; it then takes the form $$D(\tau)=\frac{1}{2T}\int_{-T}^{+T}\Sigma_n[f(t-[n-1]\tau)-g(t)]^2 dt$$

where $D(\tau)$ is an indication of the overall "closeness of fit" of all the signals and the smaller $D(\tau)$, the better the fit. It may be seen, therefore, that if it were possible to compare all the traces or sets of measurements for all possible values of $\tau$ and to select the value of $\tau$ yielding the minimum value of $D(\tau)$, the result would be the "best" correlation as defined above.

The above procedure is by no means the only one which can be used to apply the principles of our invention to the interpretation of geophysical data.

Another criterion for the best fit of two curves is based on the so-called "cross-correlation" function. It can be demonstrated mathematically that the "cross-correlation" function is derived from "least squares". Essentially the method of "cross correlation" consists of multiplying a function of an independent variable, such as depth or time, with a second related function of the same independent variable shifted by an interval $\tau$. If a curve is plotted of the average of the product of the two functions, one function being shifted by an amount $\tau$, for all $\tau$'s, the maximum or minimum point on the curve, depending upon whether the cross products are positive or negative in sign, respectively, represents the value of $\tau$ at which there is optimum correlation. A third criteria for the best fit of two curves is based on the "absolute" difference rather than on the "squared" difference between the curves. When this criterion is used, the "best fit" is achieved when the average of the absolute value of the difference is a minimum.

Figure 2:
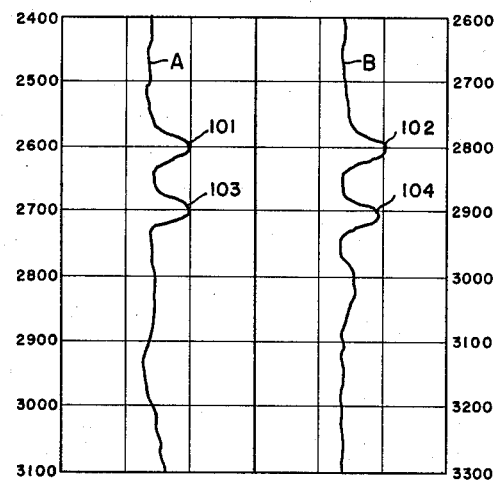
Fig. 2 shows the resistivity logs of Fig. 1, with the log of one location shifted so as to be correlated with the log taken at the second location.
Figure 3:
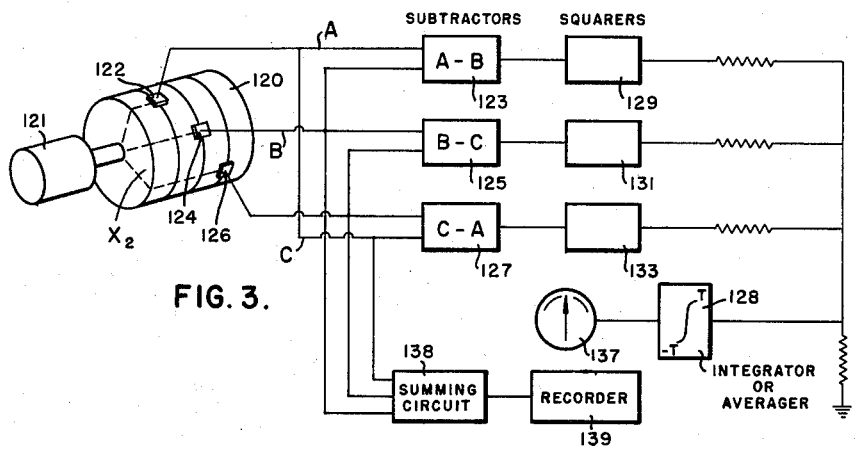
Fig. 3 is a diagram, partly schematic and partly in block form, representing an embodiment of our invention.

In order to trace the application of the aforementioned principles to a detailed method of interpretation consider Fig. 1 which represents what might be termed an ideal electrical log of two spaced apart locations. The points 101 and 102 indicate a characteristic resistivity signal peculiar to a particular type of lithologic stratum. Points 103 and 104 indicate a characteristic signal peculiar to another type of lithologic stratum. Fig. 2 shows the electrical logs after they have been correlated, the shift of log B with respect to A being 200 feet. From a knowledge of the amount of shift required for the "best fit," the depths of a particular stratum at each of the two locations are determined and consequently the amount of dip of said stratum can be ascertained. This procedure can be used to correlate any number of electrical logs. In actual practice, however, the logs obtained are often so complex, because of noise, that the characteristic signal is obscure when the logs are interpreted by a human computer. It is in the correlation of such highly complex signals that our invention has its greatest utility. In order to apply the principles of our invention to this problem it is first necessary to record the signals in some readily reproducible form, preferably in a form which may be used to generate repetitive electrical signals corresponding to the individual traces or to portions of individual traces. A preferred means of doing this would be through the use of magnetic recording. The individual signals may be recorded side by side on a magnetic drum with a suitable record-reproduce magnetic head associated with each track. Fig. 3 shows in schematic fashion how such a recording drum would be used subsequent to the recording of the seismic information thereon. The magnetic drum 120 is driven at constant speed by motor 121. Arranged about the outer surface of the drum are a plurality of magnetic heads 122, 124, and 126 which may be adjusted to occupy different angular positions around the drum as shown. It may be seen, therefore, that each track on the drum will represent one trace of a geophysical data record. Also using well known recording techniques, the electrical signal from these pickup heads, after suitable equalization, will be an equivalent electrical representation of the associated geophysical data trace. The output signals from heads 122, 124, and 126, respectively, are designated A, B, and C. As shown in Fig. 3, the several signals are applied in pairs to subtractors or difference-taking circuits 123, 125, and 127 to derive output signals indicative of the difference between each pair of signals. In the example shown in Fig. 3, three different signals will be obtained that are coupled to amplitude emphasizing circuits 129, 131, and 133, here shown as squaring circuits. The squared output signals of circuits 129, 131 and 133 are added together by a summing circuit and applied to an integrating or averaging circuit 128. A voltmeter or other suitable visual indicating device 137 may be coupled to the integrating circuit to provide a visual indication of the output voltage thereof.

When the apparatus is used for correlation of seismic signals, the output signals of the heads are also coupled to a summing circuit 138 and the summed signal is recorded by a recorder 139. The recorded signal will be representative of the message component of the traces if the time delay $\tau$ is correctly chosen. Physically, in the apparatus shown, this means that the relative angular positions of the various heads must be correct. In the seismic case, it is the determination of the correct values of $\tau$ which is the function of the apparatus of Fig. 3. To this end, the following steps may be followed:

(1) An arbitrary value of $\tau$ is so chosen by advancing the magnetic heads about the drum.

(2) The signals from the magnetic heads are electrically subtracted in pairs to obtain a plurality of difference signals. The number of difference signals is equal to the number of combinations of the magnetic heads that can be effected taking two magnetic heads at a time.

(3) The amplitude of each of the difference signals are emphasized by electrically squaring each of the difference signals.

(4) The squared difference signals are summed to derive a single output signal which is electrically integrated to derive an output voltage. The output voltage represents $D(\tau)$.

(5) $\tau$ is varied over a range of expected values until a value is found which makes $D(\tau)$ a minimum.

(6) Using this value for the shift of the heads, a permanent record is made of the sum of the output signals of the heads, which corresponds to the message.

The integral of the squared signal over the interval is proportional to the average of the signal over the interval and thus is indicative of the average of the signal over the interval. Hence, as an alternate to step 5, if desired for any reason, the squared signal is electrically integrated over the interval of interest, and the resulting signal is applied to a suitable recording device. The recording would represent $D(\tau)$. When the value of $\tau$ is changed to its next value, it is necessary that the integrator be returned to its zero value so that the integral corresponding to the new value of $\tau$ can be determined.

The required number of difference-taking circuits will vary with the number of traces to be correlated, and may be obtained from the expression $(N-1)+(N-2)+(N-3)+ \ldots$
$+[N-(N-2)]+1$ where N is the number of traces to be correlated.

It should be noted that this procedure yields three kinds of information, first, the message itself, $g(t)$, second, $D(\tau)$ which might be considered a quality rating or a measure of the degree of correlation found between the signals, and third, the specific $\tau$ at which $D(\tau)$ is a minimum.

Figure 4:
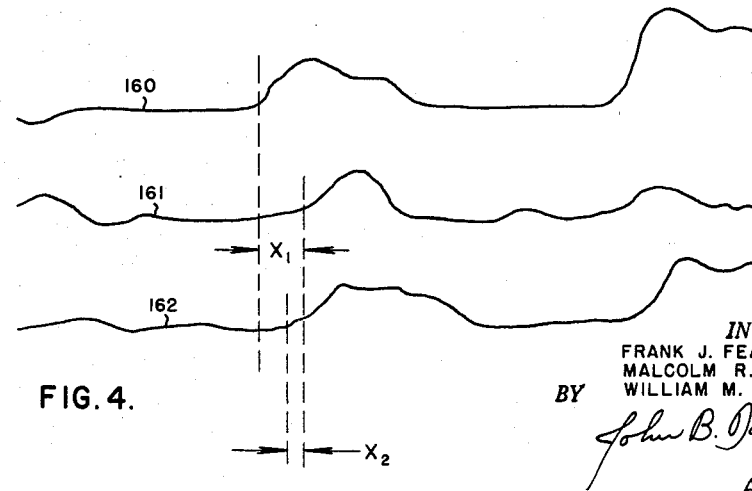
Fig. 4 shows a typical caliper-type dip-meter log and the interpretation of this log rendered by a device constructed in accordance with our invention.

Fig. 4 shows a typical dipmeter log with the orientation information omitted for clarity. Traces 160, 161, and 162 represent the profiles of the borehole wall traced by the three caliper arms. The problem in interpreting this log is that of determining the shift of the three traces which results in the best fit between them. In the case shown the two displacements are designated as $X_1$ and $X_2$. When these two distances have been established, knowing the diameter of the borehole, and the scale factor between distances in the hole and on the traces, it becomes possible to establish the dip angle of the subsurface formations. In cases where the washouts correspond closely on the three traces it is relatively simple to establish the proper displacements by visual inspection. In many holes, however, the correlation between traces is poor and even the most skillful interpreters are unable to fix the displacements with certainty. By using the method disclosed herein such determinations may be made quickly and objectively. In the apparatus of Fig. 3, using the letters A, B, and C to represent generally signals obtained from three dipmeter profile arms, the operation amounts to the evaluation of $$\frac{1}{2T}\int_{-T}^{T}[(A-B)^2+(B-C)^2+(C-A)^2]dt$$

The signals are first transcribed onto a magnetic recording drum 120 with each recording track having an associated reproduce head. For the dipmeter correlator only three arms are necessary in the usual case so that only two of the heads need be movable with respect to a fixed third head. Because of the great length of most dipmeter logs, usually it will be desirable to record only a portion on the drum at one time. Unlike in the seismic case, the actual message has no great significance in the interpretation of dipmeter logs, although it might be noted as an indication of the hole diameter. In the apparatus of Fig. 3, the differences are taken by combining the signals with reversed polarity. The differences are squared in squares 129, 131, and 133 and passed through integrator 128 after being added together in the summing circuit. With the interpretation of dipmeter logs, there is no single quantity $\tau$ such as is encountered in the seismic application, but instead two independent displacements $X_1$ and $X_2$ which must be determined independently. In practice this may be done easily by moving one head for a minimum indication and then following a similar procedure for the other movable head. The minimum value so obtained may be recorded as a quality rating of the degree of correlation. Since the amount and direction of dip may change as a function of depth, there will be some optimum interval over which to make the correlation. If the interval chosen is too great, the changes in the actual dip with depth may adversely affect the correlation, or the twist of the dipmeter about its axis as a result of torsional forces in the supporting cable may likewise reduce the correlation. On the other hand, the choice of too short an interval may place too much emphasis on small erratic borehole irregularities and does not permit integration over large enough intervals. The best interval for correlation may be determined by applying a gate circuit to the output of the pickup heads so that the interval considered may be expanded or contracted until the lowest minimum value obtained indicates that the optimum interval has been reached.

Since certain changes may be made in the above construction and different embodiments of the invention could be made without departing from the scope thereof, it is intended that all matter contained in the above description or shown in the accompanying drawings shall be interpreted as illustrative and not in a limiting sense.

What is claimed is:

1. Apparatus for evaluating geophysical data expressed as a plurality of first electrical signals of varying amplitude, each of said signals having a noise component having no geophysical significance, and a message component having geophysical significance, said apparatus comprising: time shifting means for shifting the time relationship of all except one of said electrical signals relative to said one electrical signal; first circuit means coupled to said time shifting means adapted to produce electrical signals representative of the difference between each pair of the output signals of said time shifting means; second circuit means for squaring each of said output signals of said first circuit means and adding together the squared signals thus produced; and means coupled to said second circuit means adapted to integrate the output signal from said second circuit means to obtain an output signal indicative of correlation between the time shifted first electrical signals.

2. Apparatus for evaluating geophysical data expressed as a plurality of first electrical signals of varying amplitude, each of said signals having a noise component having no geophysical significance, and a message component having geophysical significance, said apparatus comprising: time shifting means for shifting the time relationship of all except one of said electrical signals relative to said one electrical signal; first circuit means coupled to said time shifting means adapted to produce electrical signals representative of the difference between each pair of the output signals of said time shifting means; second circuit means for squaring each of said output signals of said first circuit means and adding together the squared signals thus produced; and means coupled to said second circuit means adapted to derive an output signal indicative of the average over a time interval of the output signal from said second circuit means.

3. In combination: a motor; magnetic recording means driven by said motor, said magnetic recording means having a plurality of traces recorded thereon; a plurality of spaced-apart movable magnetic heads positioned relative to said recording means for translating said traces into electrical signals and shifting the time relationship between the electrical signals; first circuit means coupled to the magnetic heads adapted to produce difference electrical signals representative of the difference between each pair of output signals from said magnetic heads; second circuit means for emphasizing the amplitudes of each of the difference electrical signals and adding together the difference signals thus produced; and means coupled to said second circuit means for deriving an output signal indicative of the average over a time interval of the summed amplitude emphasized signal from said second circuit means.

4. In combination: a motor; magnetic recording means driven by said motor, said magnetic recording means having a plurality of traces recorded thereon; a plurality of spaced-apart movable magnetic heads positioned relative to said recording means for translating said traces into electrical signals and shifting the time relationship between the electrical signals; first circuit means coupled to the magnetic heads adapted to produce difference electrical signals representative of the difference between each pair of output signals from said magnetic heads; second circuit means for emphasizing the amplitudes of each of the difference electrical signals and adding together the difference signals thus produced; means coupled to said second circuit means for deriving an output signal indicative of the average over a time interval of the summed amplitude emphasized signal from said second circuit means; and third circuit means coupled to said magnetic heads adapted to add together the output signals from said magnetic heads to obtain a sum signal; and means for recording the sum signal from said third circuit means.

5. In combination: a motor; magnetic recording means driven by said motor, said magnetic recording means having a plurality of traces recorded thereon; a plurality of spaced-apart movable magnetic heads positioned relative to said recording means for translating said traces into electrical signals and shifting the time relationship between the electrical signals; circuit means coupled to said magnetic heads adapted to produce difference signals representative of the difference between each pair of output signals from said magnetic heads; and second circuit means adapted to derive an output signal indicative of the integral of the sum of the squares of said difference signals.

6. In combination: a motor; magnetic recording means driven by said motor, said magnetic recording means having a plurality of traces recorded thereon; a plurality of spaced-apart movable magnetic heads positioned relative to said recording means for translating said traces into electrical signals and shifting the time relationship between the electrical signals; circuit means coupled to said magnetic heads adapted to produce difference signals representative of the difference between each pair of output signals from said magnetic heads; second circuit means adapted to derive an output signal indicative of the integral of the sum of the squares of said difference signals; third circuit means coupled to said magnetic heads adapted to add together the output signals from said magnetic heads to obtain a sum; and means for recording the sum signal from said third circuit means.

No references cited.